United States Patent
Joshi et al.

(10) Patent No.: US 11,704,590 B2
(45) Date of Patent: Jul. 18, 2023

(54) METHODS AND SYSTEMS FOR PREDICTING FAILURE OF A POWER CONTROL UNIT OF A VEHICLE

(71) Applicant: Toyota Motor Engineering & Manufacturing North America, Inc., Erlanger, KY (US)

(72) Inventors: Shailesh Joshi, Ann Arbor, MI (US); Hiroshi Ukegawa, Northville, MI (US); Ercan M. Dede, Ann Arbor, MI (US); Kyosuke N. Miyagi, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 1238 days.

(21) Appl. No.: 15/468,618

(22) Filed: Mar. 24, 2017

(65) Prior Publication Data
US 2018/0276546 A1    Sep. 27, 2018

(51) Int. Cl.
| | | |
|---|---|---|
| *G05B 13/04* | (2006.01) | |
| *G06N 20/00* | (2019.01) | |
| *G05B 13/02* | (2006.01) | |

(52) U.S. Cl.
CPC .......... *G06N 20/00* (2019.01); *G05B 13/026* (2013.01); *G05B 13/0265* (2013.01); *B60Y 2200/91* (2013.01); *B60Y 2200/92* (2013.01); *B60Y 2306/13* (2013.01); *Y10S 903/903* (2013.01)

(58) Field of Classification Search
CPC ........................ G05B 13/00–048; G06N 20/00
USPC ........................................ 700/47, 48; 706/12
See application file for complete search history.

(56) References Cited

U.S. PATENT DOCUMENTS

| | | | |
|---|---|---|---|
| 6,907,416 B2 | 6/2005 | Tasooji et al. |
| 7,260,501 B2 | 8/2007 | Pattipatti et al. |
| 8,676,432 B2 | 3/2014 | Patnaik et al. |
| 9,050,894 B2 | 6/2015 | Banerjee et al. |
| 9,384,603 B2 | 7/2016 | Ishikawa et al. |
| 9,430,882 B2 | 8/2016 | Ho |
| 9,495,814 B2 | 11/2016 | Ramesh |

(Continued)

FOREIGN PATENT DOCUMENTS

WO    2013156791    10/2013

OTHER PUBLICATIONS

You et al. "Real-time state-of-health estimation for electric vehicle batteries: A data-driven approach", 2016, Applied Energy.*

(Continued)

*Primary Examiner* — Jue Louie
(74) *Attorney, Agent, or Firm* — Dinsmore & Shohl LLP

(57) ABSTRACT

A method for predicting a failure of a power control unit of a vehicle is provided. The method includes obtaining data from a plurality of sensors of the power control unit of a vehicle subject to simulated multi-load conditions, implementing a machine learning algorithm on the data to obtain machine learning data, obtaining new data from the plurality of sensors of power control unit of the vehicle subject to real multi-load conditions, implementing the machine learning algorithm on the new data to obtain test data, predicting a failure of the power control unit based on a comparison between the test data and the machine learning data.

19 Claims, 6 Drawing Sheets

(56) References Cited

U.S. PATENT DOCUMENTS

| | | | |
|---|---|---|---|
| 2006/0058932 A1* | 3/2006 | Garg | B60W 50/0205 |
| | | | 701/32.8 |
| 2006/0149519 A1 | 7/2006 | Keller | |
| 2011/0130905 A1 | 6/2011 | Mayer | |
| 2012/0116696 A1 | 5/2012 | Wank | |
| 2012/0296512 A1* | 11/2012 | Lee | B60W 50/14 |
| | | | 701/29.3 |
| 2013/0049454 A1* | 2/2013 | Le | B60L 3/003 |
| | | | 307/9.1 |
| 2013/0090900 A1* | 4/2013 | Gering | G01R 31/392 |
| | | | 703/2 |
| 2013/0297141 A1* | 11/2013 | Yun | G06K 9/00 |
| | | | 701/29.1 |
| 2015/0175010 A1* | 6/2015 | Tang | H02H 7/08 |
| | | | 701/22 |
| 2015/0178997 A1* | 6/2015 | Ohsaki | G07C 5/00 |
| | | | 701/29.1 |
| 2016/0116367 A1* | 4/2016 | Pfister | G01M 7/02 |
| | | | 73/664 |
| 2016/0291114 A1* | 10/2016 | Bacquet | G01R 31/2829 |
| 2016/0349330 A1* | 12/2016 | Barfield, Jr. | G07C 5/008 |
| 2017/0117725 A1* | 4/2017 | Hendricks | H02J 7/0029 |
| 2017/0131363 A1* | 5/2017 | Scott | G01R 31/389 |
| 2017/0146611 A1* | 5/2017 | Yonan | G01R 31/3647 |
| 2018/0045771 A1* | 2/2018 | Kim | G01R 31/2617 |
| 2018/0204393 A1* | 7/2018 | Landolsi | F02M 35/021 |
| 2018/0205121 A1* | 7/2018 | Chiang | G01R 31/392 |
| 2018/0257683 A1* | 9/2018 | Govindappa | B61L 27/0077 |

OTHER PUBLICATIONS

Sheng et al. "Electric vehicle state of charge estimation: Nonlinear correlation and fuzzy support vector machine", 2015, Journal of Power Sources.*

Antonopoulos et al. "Introducing a Silicon Carbide Inverter for Hybrid Electric Vehicles", 2008, 2008 IEEE Power Electronics Specialists Conference.*

Masrur et al. "Intelligent diagnosis of open and short circuit faults in electric drive inverters for real-time applications", 2010, IET Power Electron, vol. 3, Issue 2.*

Drobnik et al. "Electric and Hybrid Vehicle Power Electronics Efficiency, Testing and Reliability", 2013, World Electric Vehicle Journal, vol. 6.*

Silva et al., "Fault Diagnosis in Electric Drives using Machine Learning Approaches", 2013, 2013 International Electric Machines & Drives Conference.*

Tabbache et al. "An improved fault-tolerant control scheme for PWM inverter-fed induction motor-based EVs", 2013, ISA Transactions.*

Ulatowski et al. "A Combinational-Logic Method for Electric Vehicle Drivetrain Fault Diagnosis", Mar./Apr. 2016, IEEE Transactions on Industry Applications, vol. 52, No. 2.*

TechTarget Contributor, "duty cycle" Sep. 21, 2005, retrieved from https://www.techtarget.com/whatis/definition/duty-cycle?vgnextfmt=print.*

Sakka et al. "DC/DC converters for Electric Vehicles", 2011, Electric Vehicles, Open Access Peer Reviewed Edited Volume, retrihttps://www.intechopen.com/chapters/19583.*

Hooper et al. "Characterising the in-vehicle vibration inputs to the high voltage battery of an electric vehicle", 2014, Journal of Power Sources.*

Otto et al. "Reliability of New SiC BJT Power Modules for Fully Electric Vehicles", 2014, Advanced Microsystems for Automotive Applications.*

Peter Andrew James "Health Monitoring of IGBTs in Automotive Power Converter Systems", 2012, Thesis, University of Manchester, School of Electrical and Electronic Engineering.*

Sankavaram et al. "Fault Diagnosis in Hybrid Electric Vehicle Regenerative Braking System", 2014, IEEE Access, vol. 2.*

Gadalla et al. "A Survey on the Reliability of Power Electronics in Electro-Mobility Applications" 2015, 2015 Intl Aegean Conference on Electrical Machines & Power Electronics (ACEMP).*

N. Patil, D. Das, M. Pecht, Anomaly detection for IGBTs using Mahalanobis distance, Microelectronics Reliability 55, pp. 1054-1059, Apr. 2015.

* cited by examiner

METHODS AND SYSTEMS FOR PREDICTING FAILURE OF A POWER CONTROL UNIT OF A VEHICLE

TECHNICAL FIELD

The present specification generally relates to methods and systems for predicting a failure of a power control unit of a vehicle and, more specifically, to predicting a failure of a power control unit of a vehicle being subject to multi-load conditions by implementing machine learning algorithm, such as a K-Nearest Neighbors algorithm.

BACKGROUND

A power control unit of a hybrid or electric vehicle controls the operation of a motor-generator of the hybrid or electric vehicle. The power control unit may require more reliable function in complicated systems involving, for example, autonomous driving in case of a failure. Thus, predicting a failure of the power control unit may be important in order to prevent any significant vehicle failures.

Accordingly, a need exists for accurately predicting a failure of hybrid or electric vehicles.

SUMMARY

In one embodiment, a method for predicting a failure of a power control unit of a vehicle is provided. The method includes obtaining data from a plurality of sensors of the power control unit of a vehicle subject to simulated multi-load conditions, implementing a machine learning algorithm on the data to obtain machine learning data, obtaining new data from the plurality of sensors of power control unit of the vehicle subject to real multi-load conditions, implementing the machine learning algorithm on the new data to obtain test data, predicting a failure of the power control unit based on a comparison between the test data and the machine learning data.

According to another embodiment, a vehicle system for predicting a failure of a power control unit of a vehicle is provided. The system includes a plurality of sensors configured to obtain data from the power control unit, and a machine learning electronic control unit. The machine learning electronic control unit includes a processor and a non-transitory electronic memory storing computer readable and executable instructions. The computer readable and executable instructions, when executed by the processor, cause the machine learning electronic control unit to: receive the data from the plurality of sensors of the vehicle being subject to simulated multi-load conditions; implement a machine learning algorithm on the data to obtain machine learning data; receive new data from the plurality of sensors of the vehicle being subject to real multi-load conditions; implement the machine learning algorithm on the new data to obtain test data; and predict a failure of the power control unit based on a comparison between the test data and the machine learning data.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
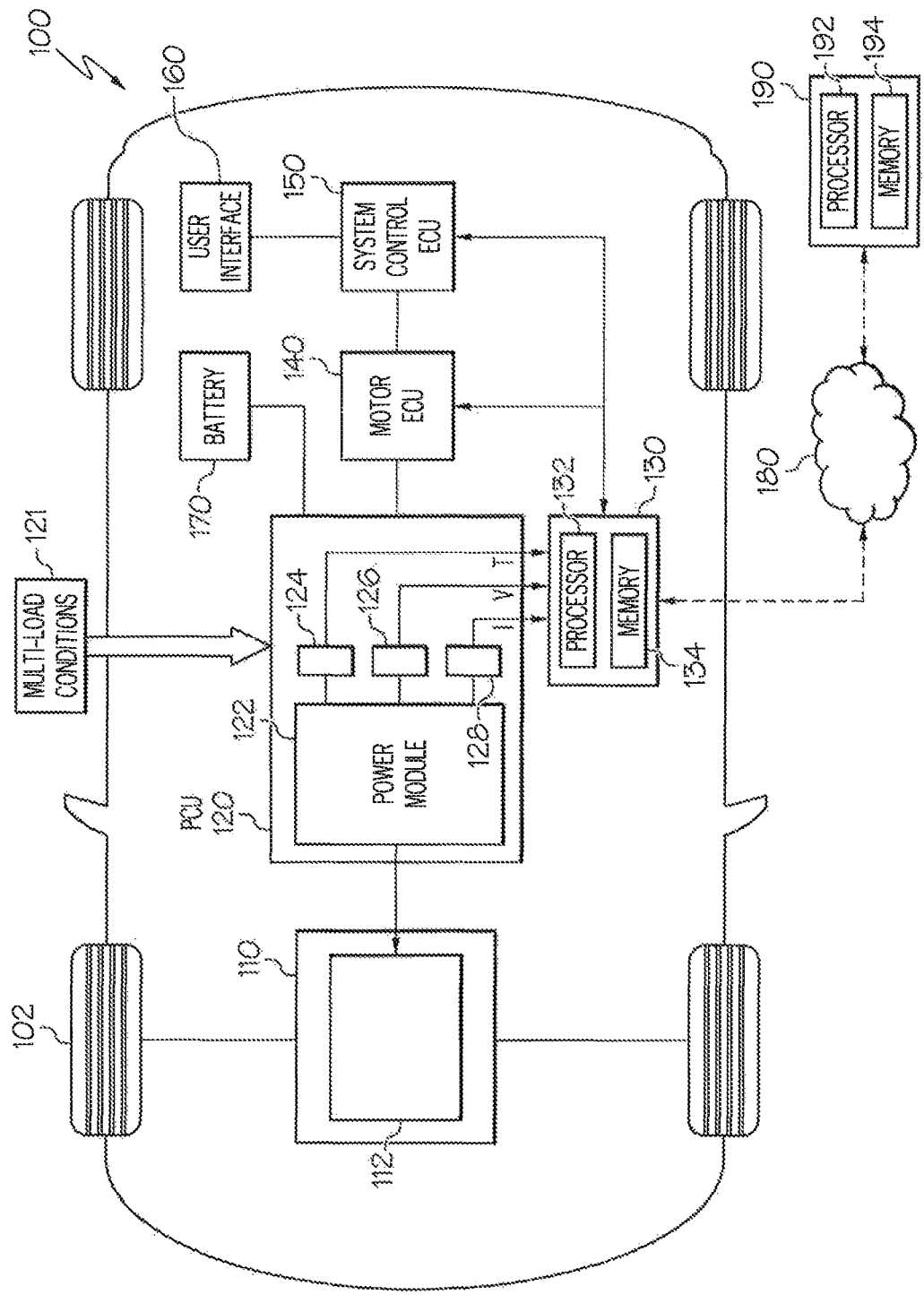
FIG. 1 schematically depicts a vehicle system in accordance with one or more embodiments shown and described herein.

Embodiments described herein relate to methods and systems for predicting a failure of a power control unit of a vehicle being subject to multi-load conditions. Referring generally to FIG. 1, the machine learning electronic control unit obtains data from a plurality of sensors of the power control unit of a vehicle being subject to simulated multi-load conditions, and implements machine learning algorithm on the data to obtain machine-learning data. Then, the machine learning electronic control unit obtains new data from the plurality of sensors of power control unit of the vehicle being subject to real multi-load conditions and implements machine learning algorithm on the new data to obtain test data. The machine learning electronic control unit predicts a failure of the power control unit based on a comparison between the test data and the machine learning data. Various embodiments of methods and systems for predicting a failure of a power control unit of a vehicle will be described in further detail herein with specific reference to the appended drawings.

Referring now to FIG. 1, an embodiment of a vehicle system 100 is schematically depicted. The vehicle system 100 may be a hybrid vehicle system or an electric vehicle system. The vehicle system 100 includes a plurality of drive wheels 102, a power train 110, a power control unit (PCU) 120, a machine learning (ML) electronic control unit (ECU) 130, a motor electronic control unit 140, a system control electronic control unit 150, a user interface 160, and a battery 170.

The power train 110 includes a motor 112. In some embodiments, the power train 110 includes a motor and a generator. In another embodiment, the power train 110 may include the motor 112 and an engine. The vehicle system 100 may be driven by a drive force from the motor 112.

The PCU 120 controls a power supplied to the motor 112. The PCU 120 includes a power module 122 and a plurality of sensors 124, 126, and 128. The PCU 120 may also include various other electronic components such as a gate drive hoard, inductors, a DC-DC converter, capacitors, a cooler, etc. The PCU 120 may include one or more silicon carbide (SiC) power devices. The use of SiC power devices allows the size of the PCU 120 to be significantly reduced compared a PCU made based on Si devices. The power module 122 may include an inverter that converts the DC from the battery 170 into an AC for driving the motor 112 and a DC-DC converter for conversion to 12V. The plurality of sensors 124, 126, and 128 may include, without limitation, a temperature sensor for sensing the temperature of the power module 122, a current sensor for sensing an electric current of the power module 122, and a voltage sensor for sensing a voltage of the power module 122. Data including the temperature, current, and voltage obtained by the plurality of sensor 124, 126, and 128 is provided to the machine learning electronic control unit (ML ECU) 130.

The ML ECU 130 includes a processor 132 and a non-transitory electronic memory 134, The processor 132 may be any device capable of executing machine readable instructions. Accordingly, the processor 132 may be a controller, an integrated circuit, a microchip, a computer, or any other computing device. The processor 132 is communicatively coupled to the other components of the vehicle system 100. For example, the processor 132 receives data from the PCU 120 and transmits signal to the motor ECU 140 and the system control ECU 150.

The non-transitory electronic memory 134 may comprise RAM, ROM, flash memories, hard drives, or any device capable of storing machine readable instructions such that the machine readable instructions can be accessed and executed by the processor 132. The machine readable instructions may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory electronic memory 134. Alternatively, the machine readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components The non-transitory electronic memory 134 may store computer readable and executable instructions that, when executed by the processor 132, causes the ML ECU 130 to implement various operations. For example, the ML ECU 130 receives the data from the plurality of sensors, and implements machine learning algorithm on the data to obtain machine learning data. The ML ECU 130 stores the machine learning data in the non-transitory electronic memory 134 and continues to update the machine learning data by implementing machine learning algorithm to data obtained from the plurality of sensors subsequently. The machine learning algorithm may be a K-Nearest Neighbors (KNN) algorithm. Based on the machine learning data stored in the non-transitory electronic memory 134, the ML ECU 130 predicts the failure of the PCU 120, which will be described in detail with reference to FIGS. 3-5 below. The ML ECU 130 provides the failure prediction of the PCU 120 to the ECU 140.

The motor ECU 140 controls the motor 112 by sending a control signal to the PCU 120. In some embodiments, the motor ECU 140 may receive data including the temperature, current, and voltage obtained by the plurality of sensors 124, 126, and 128, and provide the data to the ML ECU 130. The motor ECU 140 may include a processor and a non-transitory memory comparable to the processor 132 and the non-transitory electronic memory 134 of the ML ECU 130.

The system control ECU 150 controls the overall system of the vehicle system 100 based on input signals from various components of the vehicle system 100. For example, the system control ECU 150 collects input signals from various components of the vehicle system 100, such as the motor 112, the battery 170, etc. and controls the components based on the collected signals. The system control ECU 150 may include a processor and a non-transitory memory comparable to the processor 132 and the non-transitory electronic memory 134 of the ML ECU 130.

The user interface 160 provides information on failure prediction of the PCU 120 to a user of the vehicle system 100 by displaying an image on a display, outputting a sound, or providing a tactile feedback. For example, when the user interface 160 receives a signal from the system control ECU 150 that the failure of the PCU 120 is predicted, the user interface 160 may alert the user of the vehicle system 100 by displaying an alert light on a dashboard of the vehicle, or making an alert sound.

The battery 170 is a battery pack constituted of a plurality of cells. The battery 170 may be constituted of a plurality of battery modules connected in series, where the battery modules are each made up of a plurality of cells integrated into the battery module. The battery 170 may be a lithium ion battery.

The ML ECU 130 may be communicatively coupled to a remote server 190 via the network 180. In some embodiments, the network 180 is a personal area network that utilizes Bluetooth technology to communicatively couple the vehicle system 100 and the remote server 190. In other embodiments, the network 180 may include one or more computer networks (e.g., a personal area network, a local area network, or a wide area network), cellular networks, satellite networks and/or a global positioning system and combinations thereof. Accordingly, the vehicle system 100 can be communicatively coupled to the network 180 via a wide area network, via a local area network, via a personal area network, via a cellular network, via a satellite network, or the like. Suitable local area networks may include wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable cellular networks include, but are not limited to, technologies such as LTE, WiMAX, UMTS, CDMA, and GSM.

The remote server 190 may include a processor 192, and a non-transitory electronic memory 194. The processor 192 may be processors similar to the processor 132 described above. The non-transitory electronic memory 194 may be memory components similar to the non-transitory electronic memory 134 described above. The remote server 190 may receive data include the temperature, current, and voltage of the PCU 120, and implement the machine learning algorithm to determine whether a failure of the PCU 120 would occur.

The PCU 120 in the vehicle system 100 is subject to real multi-load conditions 104. The real multi-load conditions are a combination of various load conditions that affect the operation and life time of the PCU 120. The real multi-load conditions 121 may include a combination of a thermal condition, a power cycle, a shock, a vibration, etc. For example, the PCU 120 may be subject to a power cycle due to repetitive power on and off of the PCU 120. The PCU 120 may be subject to a varying temperature due to heat from elements of the vehicle system 100, cooling operations by a cooler of the vehicle system 100, or a varying external temperature. The PCU 120 may be subject to a vibration condition due to various vibrations of the vehicle system 100 while driving, such as a vibration due to rough road conditions, a vibration due to wind, etc. These multi-load conditions significantly affect the likelihood of a failure of the PCU 120.

Figure 2:
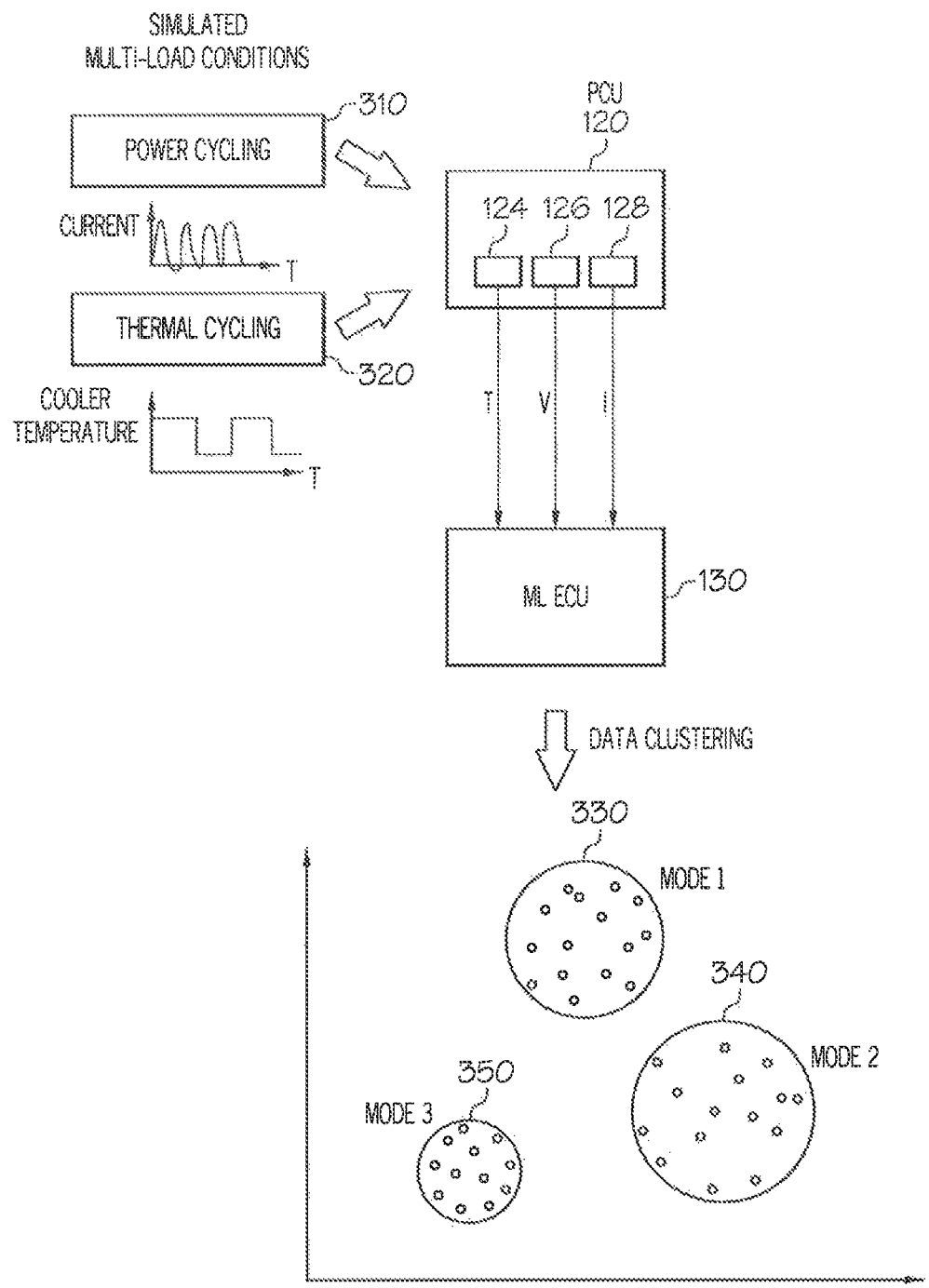
FIG. 2 schematically depicts collecting machine learning data from the power control unit being subject to simulated multi-load conditions in accordance with one or more embodiments shown and described herein.

FIG. 2 schematically depicts collecting machine learning data from the PCU 120 subject to simulated multi-load conditions. In embodiments, simulated multi-load conditions may be a combination of a simulated power cycle, a simulated thermal cycle, a simulated shock, a simulated vibration, etc. In FIG. 2, simulated multi-load conditions including a simulated power cycling 310 and a simulated thermal cycling 320 are applied to the PCU 120. For example, the simulated power cycling 310 is applied to the PCU 120 by repeatedly powering on and off the PCU 120. The simulated thermal cycling 320 is applied to the PCU 120 by repeatedly changing the temperature of a cooler of the PCU 120, The plurality of sensors 124, 126 and 128 of the PCU 120 detect the temperature (T), voltage (V), and current (I) of the PCU 120 and send the data including the temperature, voltage and the current to the ML ECU 130.

The ML ECU 130 then implements a machine learning algorithm, such as a K-Nearest Neighbors algorithm, on the data to obtain machine learning data, such as data clusters 330, 340, and 350 as shown in FIG. 2. The ML ECU 130 continues to collect data from the PCU 120 and updates the data clusters 330, 340 and 350 as new data becomes available and removes erroneous and outlier data. The data cluster 330 may be a cluster of machine learning data for temperature (T). The data cluster 340 may be a cluster of machine learning data for voltage (V). The data cluster 350 may be a cluster of machine learning data for current (I).

Although the PCU 120 is shown to be subject to the simulated power cycling 310 and the thermal cycling 320 in FIG. 2, it can be subject to various other multi-load conditions and the data clusters 330, 340, and 350 are continuously updated. For example, the PCU 120 may be subject to simulated vibrations and shocks, and the plurality of sensors 124, 126 and 128 detect the temperature (T), voltage (V), and current (I) of the PCU 120 being subjected to the simulated vibrations and shocks. The ML ECU 130 receives the data including the temperature, voltage and the current and implements machine learning algorithm to update the data clusters 330, 340, and 350 in another example, the PCU 120 may be subject to a simulated power cycle, simulated vibrations, and simulated shocks, and the plurality of sensors 124, 126 and 128 detect the temperature (T), voltage (V), and current (I) of the PCU 120 being subjected to the simulated power cycle, vibrations, and shocks. The ML ECU 130 receives the data including the temperature, voltage and current and implements machine learning algorithm to update the data clusters 330, 340, and 350. In another example, the PCU 120 may be subject to a simulated power cycle, a simulated thermal cycle, simulated vibrations and simulated shocks, and the plurality of sensors 124, 126 and 128 detects the temperature (T), voltage (V), and current (I) of the PCU 120 being subjected to the simulated power cycle, thermal cycle, vibrations and shocks. The ML ECU 130 receives the data including the temperature, voltage, and current and implements machine learning algorithm to update the data clusters 330, 340, and 350.

Figure 3:
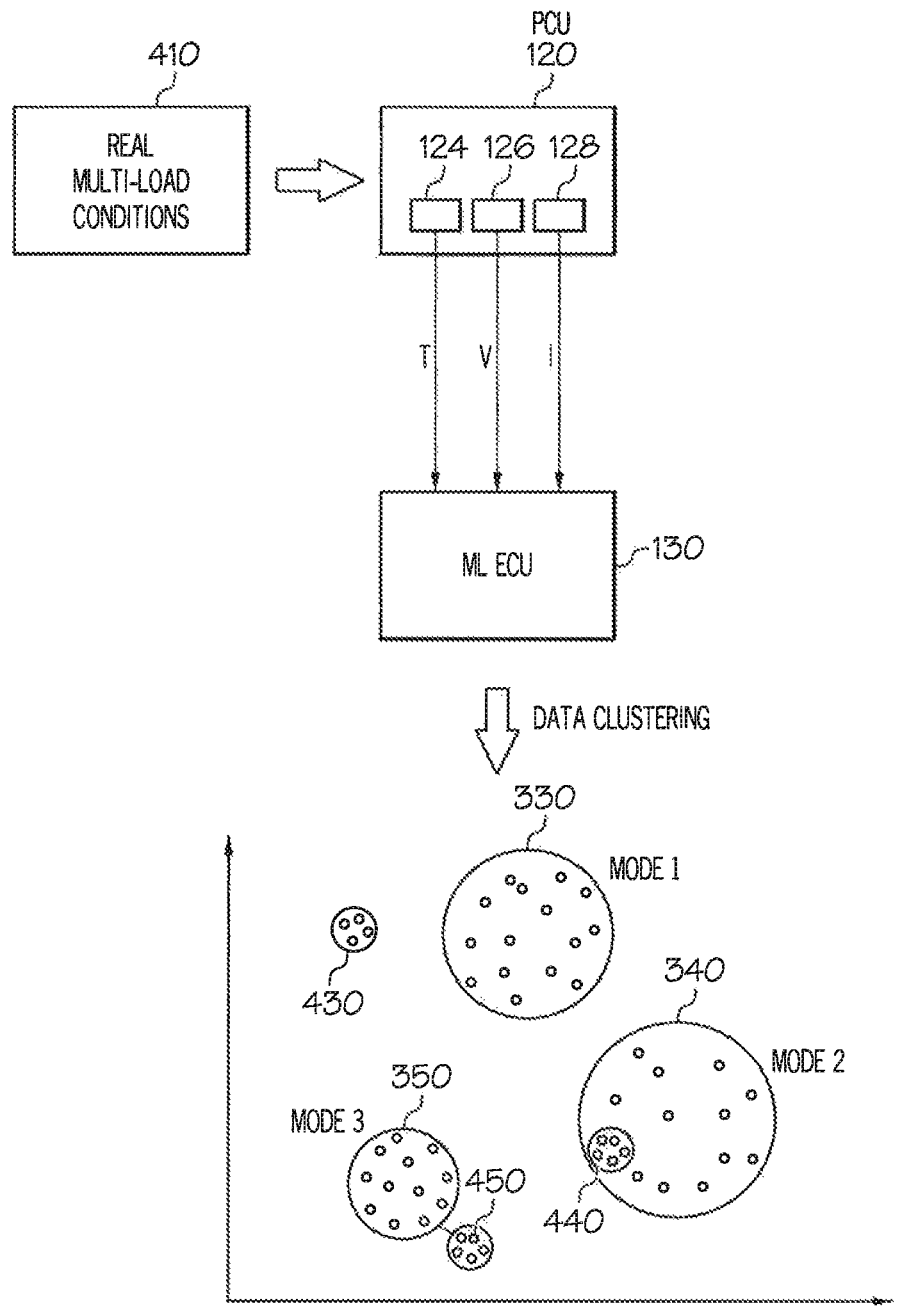
FIG. 3 schematically depicts collecting machine learning data from the power control unit being subject to real multi-load conditions in accordance with one or more embodiments shown and described herein.

FIG. 3 schematically depicts collecting machine learning data from the PCU subject to real multi-load conditions. In embodiments, real multi-load conditions may be a combination of a real power cycle, a real thermal cycle, a real shock, a real vibration, etc. For example, when the vehicle system 100 is on driving, it may be subject to a real shock and a real vibration due to external stresses such as air, road conditions, rains, etc. In addition, the vehicle system 100 may be subject to a real power cycle due to ignition on/off, and a real thermal cycle due to changes of ambience temperature, and/or cooler temperature.

In FIG. 3, real multi-load conditions 410 are applied to the PCU 120. The plurality of sensors 124, 126 and 128 of the PCU 120 detect the temperature (T), voltage (V), and current (I) of the PCU 120 and send the data including the temperature, voltage and the current to the ML ECU 130. The ML ECU 130 then implements machine learning algorithm, such as K-Nearest Neighbors algorithm to obtain machine learning data, such as data clusters 430, 440, and 450 as shown in FIG. 3. The ML ECU 130 continues to collect data from the PCU 120 and updates the data clusters 430, 440, and 450 as new data becomes available and removes erroneous and outlier data. The data cluster 430 may be a cluster of machine learning data for temperature (T). The data cluster 440 may be a cluster of machine learning data for voltage (V). The data cluster 450 may be a cluster of machine learning data for current (I).

The data clusters 430, 440, and 450 are compared with the data clusters 330, 340, and 350 to determine whether a failure of the PCU 120 would occur. For example, the data cluster 430 is determined to be located outside of the boundaries of the data clusters 330, 340, and 350, and the PCU 120 predicts the failure of the PCU 120 because the data cluster 430 is located outside the boundaries of the data clusters 330, 340, and 350 which are obtained during a normal operation of the PCU 120 being subject to various multi-load conditions. The data cluster 450 is determined to be located outside the boundaries of the data clusters 330, 340, and 350, and the PCU 120 predicts the failure of the PCU 120. The data cluster 440 is determined to be located within the boundary of the data cluster 340, and the PCU 120 predicts no failure of the PCU 120. In another embodiment, the average value of each of the data clusters 430, 440, and 450 is calculated. If the average value is within any of the boundaries of the data clusters 330, 340, and 350, then the PCU may predict no failure of the PCU 120.

Figure 4:
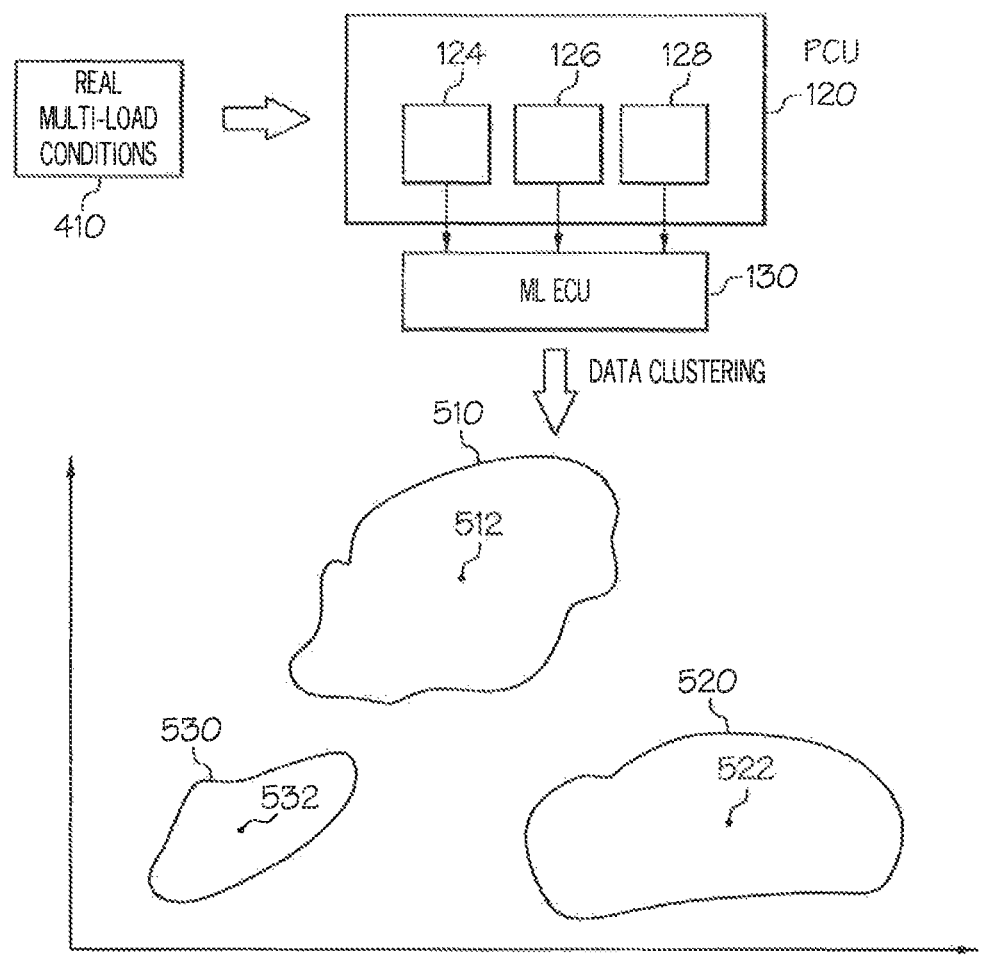
FIG. 4 depicts data clusters that are obtained from the power control unit subject to real multi-load conditions in accordance with another embodiment shown and described herein.

FIG. 4 depicts data clusters 510, 520, and 530 that are obtained from the PCU 120 subject to real multi-load conditions in accordance with another embodiment shown and described herein. The plurality of sensors 124, 126 and 128 of the PCU 120 detect the temperature (T), voltage (V), and current (I) of the PCU 120 and send the data including the temperature, voltage and the current to the ML ECU 130. The ML ECU 130 then implements machine leanings algorithm, such as K-Nearest Neighbors algorithm to obtain machine learning data, such as data clusters 530, 540, and 550 as shown in FIG. 4.

The ML ECU 130 calculates the average values 512, 522, and 532 of the data clusters 510, 520, and 530, respectively. Each of the average values 512, 522, and 532 may be a mean, median, or mode of the data clusters 510, 520, and

530. Then, the ML ECU 130 calculates the standard deviation of each of the data clusters 510, 520, and 530 based on the average values 512, 522, and 532. The greater the standard deviation is, the stronger the likelihood of abnormal operations of the PCU 120 is. If the standard deviation is greater than a certain threshold value, then the ML ECU 130 may determine that a failure of the PCU 120 would occur.

Figure 5:
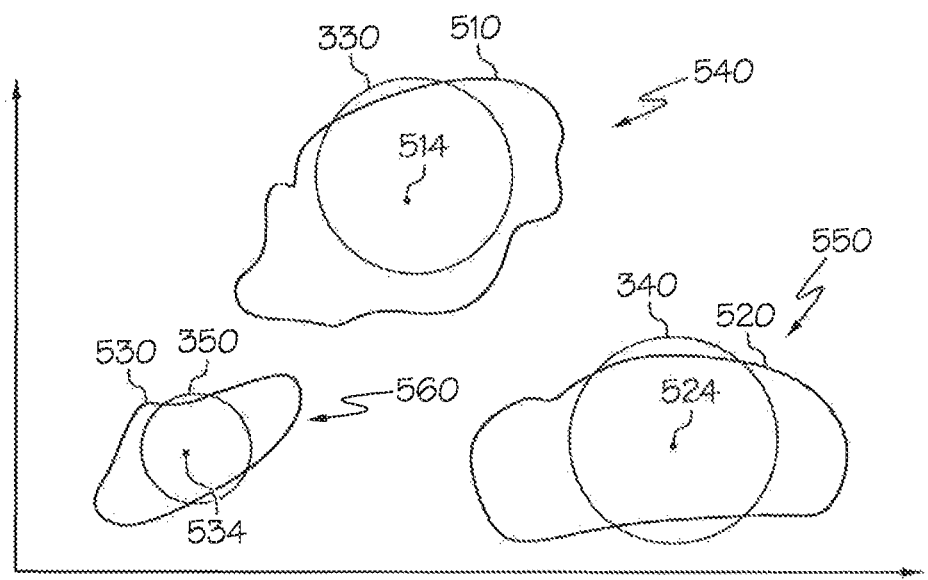
FIG. 5 depicts combination data clusters including data clusters obtained based on simulated multi-load conditions and data clusters obtained based on real multi-load conditions according to another embodiment shown and described herein.

FIG. 5 depicts combination data clusters according to another embodiment shown and described herein. Combination data clusters 540, 550 and 560 include both the data clusters 330, 340, and 350 obtained based on simulated multi-load conditions and the data clusters 510, 520, and 530 obtained based on real multi-load conditions, respectively. Then, the ML ECU 130 calculates the average values 514, 524, and 534 of the combination data clusters 540, 550, and 560, respectively. Each of the average values 514, 524, and 534 of the combination data clusters 540, 550, and 560 may be a mean, median, or mode of the combination data clusters. Then, the ML ECU 130 calculates the standard deviation of each of the combination data clusters 540, 550, and 560 based on the average values 514, 524, and 534. If the standard deviation is greater than a certain threshold value, then the ML ECU 130 may determine that a failure of the PCU 120 would occur.

Figure 6:
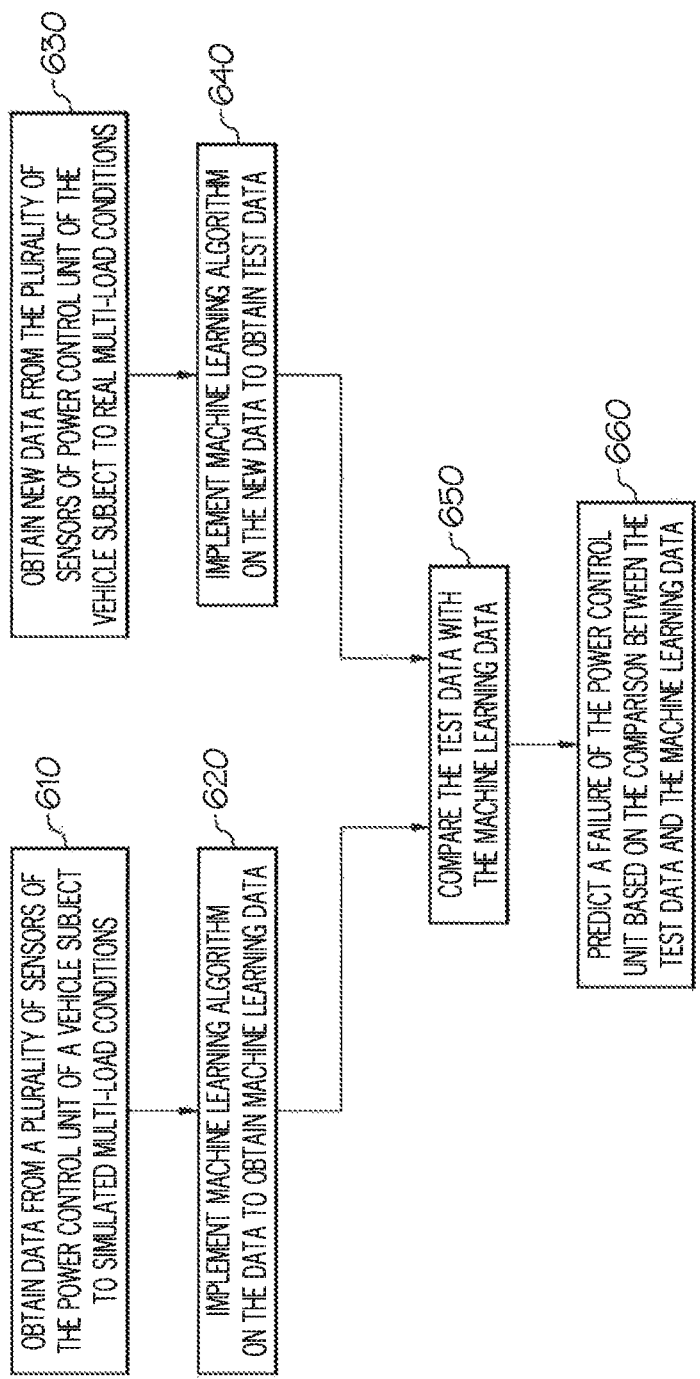
FIG. 6 depicts a flowchart of a method for predicting a failure of a power control unit of a vehicle.

FIG. 6 depicts a flowchart of a method for predicting a failure of a power control unit of a vehicle. In step 610, the ML ECU 130 of the vehicle system 100 obtains data from the plurality of sensors 124, 126, and 128 of the PCU 120 of the vehicle system 100 being subject to simulated multi-load conditions. Simulated multi-load conditions may be a combination of a simulated power cycle, a simulated thermal cycle, a simulated shock, a simulated vibration, etc.

In step 620, the ML ECU 130 implements a machine learning algorithm on the data to obtain machine learning data. The machine learning data includes a plurality of data clusters. For example, the ML ECU 130 implements machine learning algorithm on the data including the temperature, voltage, and current of the PCU 120 to obtain the data clusters 330, 340, and 350 in FIG. 3. The ML ECU 130 may continue to collect data from the PCU 120, update the data clusters 330, 340 and 350 as new data becomes available, and remove erroneous and outlier data.

In step 630, the ML ECU 130 obtains new data from the plurality of sensors 124, 126, and 128 of the PCU 120 of the vehicle system 100 being subject to real multi-load conditions. Real multi-load conditions may be a combination of a real power cycle, a real thermal cycle, a real shock, a real vibration, etc. applied to the vehicle system 100 while the vehicle system 100 is in operation.

In step 640, the ML ECU 130 implements a machine learning algorithm on the new data to obtain test data. The machine learning algorithm used in step 640 is the same as the machine learning algorithm used in step 620. For example, the ML ECU 130 implements machine learning algorithm on the new data including the temperature, voltage, and current of the PCU 120 being subject to real multi-load conditions, and obtains test data, such as the data clusters 430, 440, and 450 shown in FIG. 4.

In step 650, the ML ECU 130 compares the test data obtained in step 640 with the machine learning data obtained in step 620. In one embodiment, the ML ECU 130 determines whether each of the data clusters 430, 440, and 450 is within any of the boundaries of the data clusters 330, 340, and 350 obtained in step 620. In another embodiment, the ML ECU 130 calculates an average value of the test data, and determines whether the average value is within any of the boundaries of the data clusters 330, 340, and 350. In another embodiment, the ML ECU 130 calculates a standard deviation of the test data as shown in FIG. 5.

In step 660, the ML ECU 130 predicts a failure of the PCU 120 based on the comparison between the new data and the machine learning data. For example, if the test data (e.g., the data clusters 430, 440, and 450) is not within any of the boundaries of the data clusters 330, 340, and 350, then the ML ECU 130 determines that a failure of the PCU 120 would occur. In another embodiment, if the standard deviation of the test data calculated in step 650 is greater than a certain threshold value, then the ML ECU 130 determines that a failure of the PCU 120 would occur. The ML ECU 130 may send an instruction to the user interface 160 for alerting a failure of the PCU 120 to a user.

Figure 7:
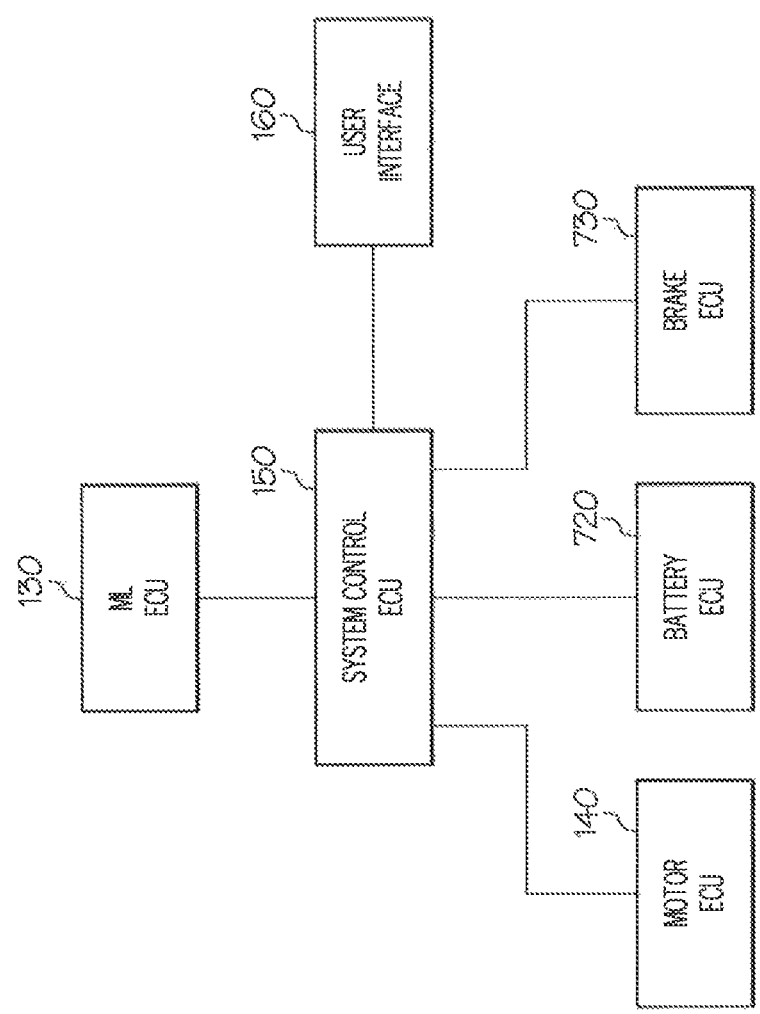
FIG. 7 schematically depicts a vehicle system including the ML ECU 130 that serves failure prediction as well as energy management/optimization in accordance with one or more embodiments shown herein.

FIG. 7 schematically depicts a vehicle system including the ML ECU 130 that serves failure prediction as well as energy management/optimization in accordance with one or more embodiments shown herein. The ML ECU 130 communicates with the system control ECU 150 with respect to the failure prediction of the PCU 120. For example, if the ML ECU 130 determines that the PCU 120 would fail, then the ML ECU 130 sends a notification to the system control ECU 150, which in turn sends a signal to the user interface 160 for notifying a user of the failure prediction. In addition, the system control ECU 150 may adjust operations of components of the vehicle system 100 by sending instructions to, without limitation, the motor ECU 140, a battery ECU 720, and a brake ECU 730. For example, the system control ECU 150 may send a command for adjusting a motor torque to the motor ECU 140 in response to the failure prediction from the ML ECU 130. The system control ECU 150 may send a command for adjusting a battery power to the battery ECU 720 in response to the failure prediction from the ML ECU 130. The system control ECU 150 may send a command for adjusting a regeneration required torque to the brake ECU 730 in response to the failure prediction from the ML ECU 130.

The ML ECU 130 may provide energy optimization for the vehicle system 100. The system control ECU 150 collects data from the motor ECU 140, the battery ECU 720, and the brake ECU 730. For example, the system control ECU 150 collects motor rotation data from the motor ECU 140, the status of charge (SoC) from the battery ECU 720, and a regeneration actual torque from the brake ECU 730. Then, the system control ECU 150 transmits the collected data to the ML ECU 130. The ML ECU 130 implements machine learning algorithm for energy optimization and obtains optimized values for the motor torque, the battery power, and the regeneration required torque. Then, the ML ECU 130 transmits the optimized values for the motor torque, the battery power, and the regeneration required torque to the system control ECU 150 which instructs the motor ECU 140, the battery ECU 720, and the brake ECU 730 based on the motor torque, the battery power, and the regeneration required torque.

A method for predicting a failure of a power control unit of a vehicle is provided. The method includes obtaining data from a plurality of sensors of the power control unit of a vehicle subject to simulated multi-load conditions, implementing machine learning algorithm on the data to obtain machine learning data, obtaining new data from the plurality of sensors of power control unit of the vehicle subject to real multi-load conditions, implementing machine learning algorithm on the new data to obtain test data, predicting a failure of the power control unit based on a comparison between the test data and the machine learning data. By implementing the machine learning algorithm on data obtained from the power control unit being subject to multi-load conditions, the vehicle system according to the present disclosure predicts a failure of the power control unit more accurately.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is, therefore, intended that the appended claims cover all such changes and modifications that are within the scope of the claimed subject matter.

What is claimed is:

1. A method for predicting a failure of a power control unit of a vehicle, the method comprising:
    obtaining data including a simulated voltage, a simulated current, and a simulated temperature of the power control unit from a plurality of sensors configured to measure the simulated voltage, the simulated current, and the simulated temperature of the power control unit of the vehicle being subject to simulated multi-load conditions including a simulated thermal cycling, a simulated power cycling, and a simulated vibration cycling simultaneously, the power control unit being configured to control power from a battery of the vehicle, the power control unit being a separate element from the battery;
    implementing a machine learning algorithm on the data including a temperature of the power control unit to obtain machine learning data;
    obtaining new data including a real voltage, a real current, and a real temperature of the power control unit from the plurality of sensors for measuring the power control unit of the vehicle being subject to real multi-load conditions including a thermal cycle, a power cycle, and a vibration;
    implementing the machine learning algorithm on the new data to obtain test data;
    predicting that the power control unit is going to fail based on a comparison between the test data and the machine learning data, and
    sending, to a brake electronic control unit, a command for adjusting a regeneration required torque in advance of a failure of the power control unit in response to predicting that the power control unit is going to fail.

2. The method of claim 1, wherein the machine learning algorithm includes a K-Nearest Neighbors algorithm.

3. The method of claim 1, wherein predicting a failure of the power control unit based on a comparison between the test data and the machine learning data comprises:
    determining whether the test data is within a boundary of the machine learning data; and
    issuing a failure prediction of the power control unit in response to determination that the test data is not within the boundary of the machine learning data.

4. The method of claim 1, wherein predicting a failure of the power control unit based on a comparison between the test data and the machine learning data comprises:
    calculating a deviation of the test data from the machine learning data; and
    issuing a failure prediction of the power control unit if the deviation is greater than a threshold value.

5. The method of claim 1, wherein predicting a failure of the power control unit based on a comparison between the test data and the machine learning data comprises:
    calculating a standard deviation of the test data; and
    issuing a failure prediction of the power control unit if the standard deviation is greater than a threshold value.

6. The method of claim 1, wherein the real multi-load conditions further include a shock, and a pressure.

7. The method of claim 1, wherein the power control unit comprises at least one of a DC-DC converter, a gate drive board, a cooler, capacitors, a power module, and inductors.

8. The method of claim 1, further comprising:
    transmitting the test data to a remote server, wherein the remote server stores the machine learning data associated with the simulated multi-load conditions; and
    receiving, from the remote server, a prediction of the failure of the power control unit based on the comparison between the test data and the machine learning data.

9. The method of claim 1, wherein the power control unit includes one or more silicon carbide power devices.

10. The method of claim 1, wherein the power control unit comprises an inverter that converts a DC from the battery into an AC for driving a motor of the vehicle.

11. The method of claim 1, wherein the simulated power cycling is applied to the power control unit by repeatedly powering on and off the power control unit, and
    the simulated thermal cycling is applied to the power control unit by repeatedly changing temperature of a cooler of the power control unit.

12. The method of claim 1, wherein the simulated multi-load conditions further include a simulated vibration cycling applied to the power control unit by vibrating the power control unit.

13. The method of claim 1, further comprising:
    sending, to a motor electronic control unit, a command for adjusting a motor torque in advance of a failure of the power control unit in response to predicting that the power control unit is going to fail.

14. The method of claim 1, further comprising:
    sending, to a battery electronic control unit, a command for adjusting a battery power in advance of a failure of the power control unit in response to predicting that the power control unit is going to fail.

15. A vehicle system for predicting a failure of a power control unit of a vehicle, the vehicle system comprising:
    a plurality of sensors configured to obtain data from the power control unit; and
    a machine learning electronic control unit configured to:
        receive the data including a simulated voltage, a simulated current, and a simulated temperature of the power control unit from the plurality of sensors configured to measure the simulated voltage, the simulated current, and the simulated temperature of the vehicle being subject to simulated multi-load conditions including a simulated thermal cycling, a simulated power cycling and a simulated vibration cycling simultaneously, the power control unit being configured to control power from a battery of the vehicle, the power control unit being a separate element from the battery;

implement a machine learning algorithm on the data including a temperature of the power control unit to obtain machine learning data;

receive new data including a real voltage, a real current, and a real temperature of the power control unit from the plurality of sensors for measuring the vehicle being subject to real multi-load conditions including a thermal cycle, a power cycle, and a vibration;

implement the machine learning algorithm on the new data to obtain test data;

predict that the power control unit is going to fail based on a comparison between the test data and the machine learning data; and send, to a brake electronic control unit, a command for adjusting a regeneration required torque in advance of a failure of the power control unit in response to predicting that the power control unit is going to fail.

16. The vehicle system of claim 15, further comprising:
a user interface configured to provide an alert of failure prediction of the power control unit in response to failure prediction of the power control unit by the machine learning electronic control unit.

17. The vehicle system of claim 15, wherein the power control unit includes one or more silicon carbide power devices.

18. The vehicle system of claim 15, wherein the power control unit comprises at least one of a DC-DC converter, a gate drive board, a cooler, capacitors, a power module, and inductors.

19. The vehicle system of claim 15, wherein the machine learning electronic control unit is further configured to:
determine whether the test data is within a boundary of the machine learning data; and
issue a failure prediction of the power control unit in response to determination that the test data is not within the boundary of the machine learning data.

* * * * *